(12) United States Patent
Chang et al.

(10) Patent No.: US 7,490,020 B2
(45) Date of Patent: Feb. 10, 2009

(54) SYSTEM AND METHOD FOR CONTROLLING OPERATIONS OF A MEASURING MACHINE

(75) Inventors: Chih-Kuang Chang, Taipei-Hsien (TW); Hua-Wei Yang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/770,753

(22) Filed: Jun. 29, 2007

(65) Prior Publication Data

US 2008/0071491 A1 Mar. 20, 2008

(30) Foreign Application Priority Data

Sep. 15, 2006 (CN) .................. 2006 1 0062684

(51) Int. Cl.
*G01C 9/00* (2006.01)
*G06F 15/00* (2006.01)
(52) U.S. Cl. .................. 702/152; 33/502; 700/193
(58) Field of Classification Search ............ 702/87, 702/95, 152; 33/502; 700/57, 121, 254
See application file for complete search history.

(56) References Cited

U.S. PATENT DOCUMENTS

| 5,949,685 A * | 9/1999 | Greenwood et al. ......... 700/193 |
| 2002/0032541 A1 * | 3/2002 | Raab et al. .................. 702/152 |
| 2005/0283989 A1 | 12/2005 | Pettersson |

* cited by examiner

*Primary Examiner*—John H Le
(74) *Attorney, Agent, or Firm*—Frank R. Niranjan

(57) ABSTRACT

A method for controlling operations of a measuring machine is provided. The method includes the steps of: clearing faults when there are the faults occur in a measuring machine; sending a restart instruction via a control card to the measuring machine for controlling the movable arm to return to an initial position in relation to an X-axis, a Y-axis and a Z-axis directions; sending a move instruction comprising information of a final position to the control card; executing the move instruction; calculating a current position of the movable arm according to a count tracked by a raster ruler; determining whether the movable arm locates at the final position of the measuring machine according to the count; and controlling the movable arm to move along the measuring machine by executing a next move instruction, if the movable arm locates at the final position. A related system is also disclosed.

11 Claims, 5 Drawing Sheets

SYSTEM AND METHOD FOR CONTROLLING OPERATIONS OF A MEASURING MACHINE

BACKGROUND OF THE INVENTION

1. Field of the Invention

The present invention generally relates to a system and method for controlling operations of a measuring machine.

2. Description of Related Art

Product quality is an important factor in improving the competitiveness of an enterprise. To assure and improve product's quality, manufacturers usually measure the product's prototype before the product is mass-produced. With the advancement of computer technology, computers have been introduced to the prototype's measuring process. An accuracy of measuring the prototype has been greatly improved. A measuring machine, such as a three-dimensional measuring machine or a coordinate measuring machine (CMM) controlled by a computer, has been used for measuring profile and dimensions of the prototype. During the measuring process, the prototype is placed on a measuring area of the CMM, the measuring machine includes a movable arm with a charge coupled device to collect images of the prototype. The collected images are used for measuring the profile and dimension of the prototype.

However, the movable arm conventionally used by the measuring machine can not move accurately along a designated path, thus causing time loss to have engineers to repeat the measuring process of the prototype, and further affecting an accuracy of the dimensions of the prototype has been reduced. Additionally, conventional measuring processes does not check a state of the measuring machine before the measuring machine begins to obtain the dimensions of the prototype, thus a safety environment of the measuring machine cannot be ensured while the measuring machine is operating.

What is needed, therefore, is a system and method for controlling operations of a measuring machine, which can accurately control the movable arm to move along a designated path, and check states of the measuring machine before the measuring machine begins to operate, so as to improve a precision when a measuring a product prototype and ensure a safety while the measuring machine is operating.

SUMMARY OF THE INVENTION

A system for controlling operations of a measuring machine, comprising a computer, a control card, a servo and a raster ruler fixed on a movable arm of the measuring machine, the computer comprising: a checking unit configured for checking whether there are any faults before the movable arm begins to work, and for clearing faults of the measuring machine when there are faults; a restart unit configured for sending a restart instruction via the control card to the measuring machine for controlling the movable arm to return to an initial position in relation to an X-axis, a Y-axis and a Z-axis directions; and an instruction sending unit configured for sending a move instruction to the measuring machine via the control card for controlling the movable arm to move along the measuring machine by executing the move instruction; and a calculating unit configured for calculating a current position of the movable arm according to a count tracked by the raster ruler, and for determining whether the movable arm locates at a final position to the count.

Another preferred method for controlling operations of a measuring machine is also disclosed. The method includes the steps of: clearing faults of the measuring machine when there are the faults occur in a measuring machine; sending a restart instruction via a control card to the measuring machine for controlling the movable arm to return to an initial position at an X-axis, a Y-axis and a Z-axis directions; sending a move instruction comprising information of a final position to the control card; executing the move instruction; calculating a current position of the movable arm according to a count tracked by a raster ruler; determining whether the movable arm locates at the final position according to the count; and controlling the movable arm to move along with the measuring machine by executing a next move instruction, if the movable arm locates at the final position.

Other advantages and novel features of the embodiments will be drawn from the following detailed description with reference to the attached drawings.

DETAILED DESCRIPTION OF THE INVENTION

In order to describe preferred embodiments conveniently, here gives the following technical terms:

servo: including a driver, an encoder, and a motor. The servo is used for receiving move instructions that drives a movable arm of a measuring machine according to the move instructions. Each of the move instructions contains information of a final position where the movable arm will locate, and a speed fraction of the movable arm.

closed loop: a loop circuit of the servo is closed.

opened loop: a loop circuit of the servo is opened.

emergency stop button: a button attached on a base of the measuring machine that halts/stops the movable arm when there is an emergency.

limit switch: a switch attached on the base of the measuring machine, the limit switch is used for limiting a movement of the movable arm under a predetermined position.

initial position: when the measuring machine is powered on, the measuring machine returns to an initial reference position whose three dimensional coordinate is, for exemplary purposes, (0, 0, 0).

Figure 1:
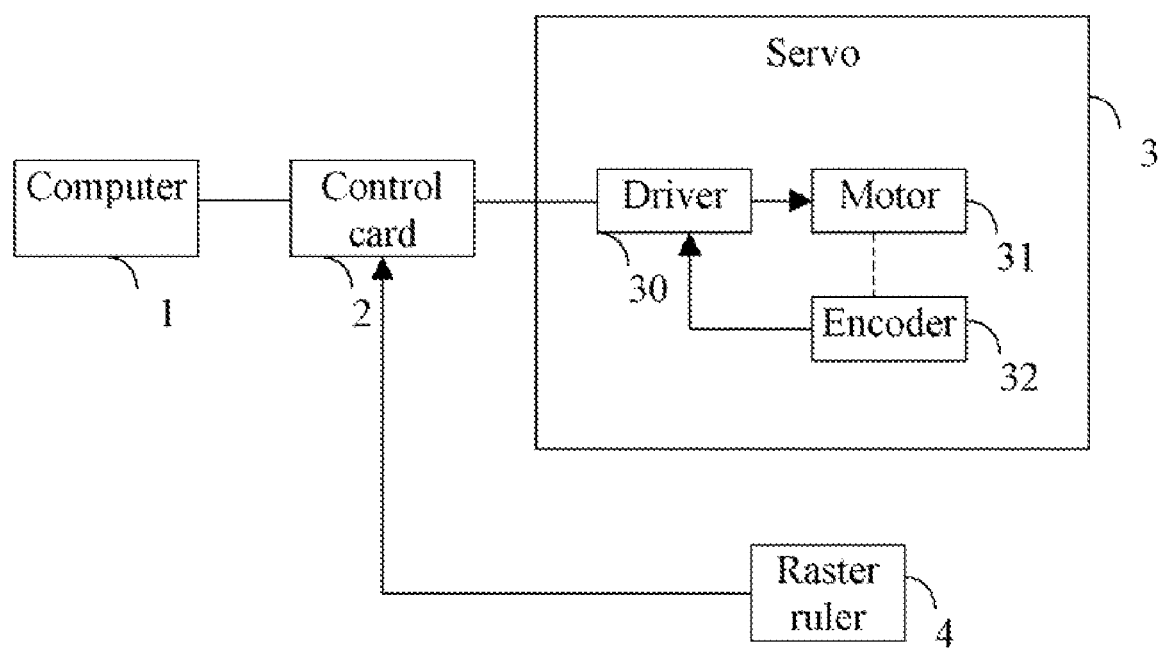
FIG. 1 is a schematic diagram of a system for controlling movement of a measuring machine in accordance with the preferred embodiment.

FIG. 1 is a schematic diagram of a system for controlling operations of the measuring machine (hereinafter, "the system") in accordance with the preferred embodiment. The system includes a computer 1, a control card 2, a servo 3, and a raster ruler 4. The computer 1 controls the servo 3 by sending restart instructions or the move instructions via the control card 2. The servo 3 drives the movable arm to move on the measuring machine according to the move instructions, so as to actuate a charge-coupled device (CCD) fixed on the movable arm to collect images of the product prototype accurately. Each of the move instructions includes information of a speed fraction, and a final position. The raster ruler 4 is a position feedback component that is fixed on the movable arm of the measuring machine and may be a magnetoscale ruler or a rotary encoder. When the movable arm moves, thus moving the raster ruler on it, the raster ruler 4 returns a feedback pulse to the control card 2. Simultaneously, the raster ruler 4 starts counting from zero to calculate a current position of the movable arm.

The servo 3 includes a driver 30, a motor 31 and an encoder 32. The encoder 32 is fixed on the motor 31. When the driver 30 receives an analog voltage from the control card 2, the driver 30 outputs a pulse width modulation (PWM) to the motor 31. At the same time, the encoder 32 outputs the feedback pulse to the driver 30 to control a moving speed of the movable arm.

The computer 1 can also check a state of the measuring machine before the measuring machine begins to operate. The state typically includes a state of the servo 3, a state of an emergency stop button, and a state of the limit switch. The state of the servo 3 includes a closed loop state and an opened loop state. The state of the emergency stop button includes an enabled state and a disabled state. The state of the limit switch also includes a power-on state and a power-off state.

Figure 2:
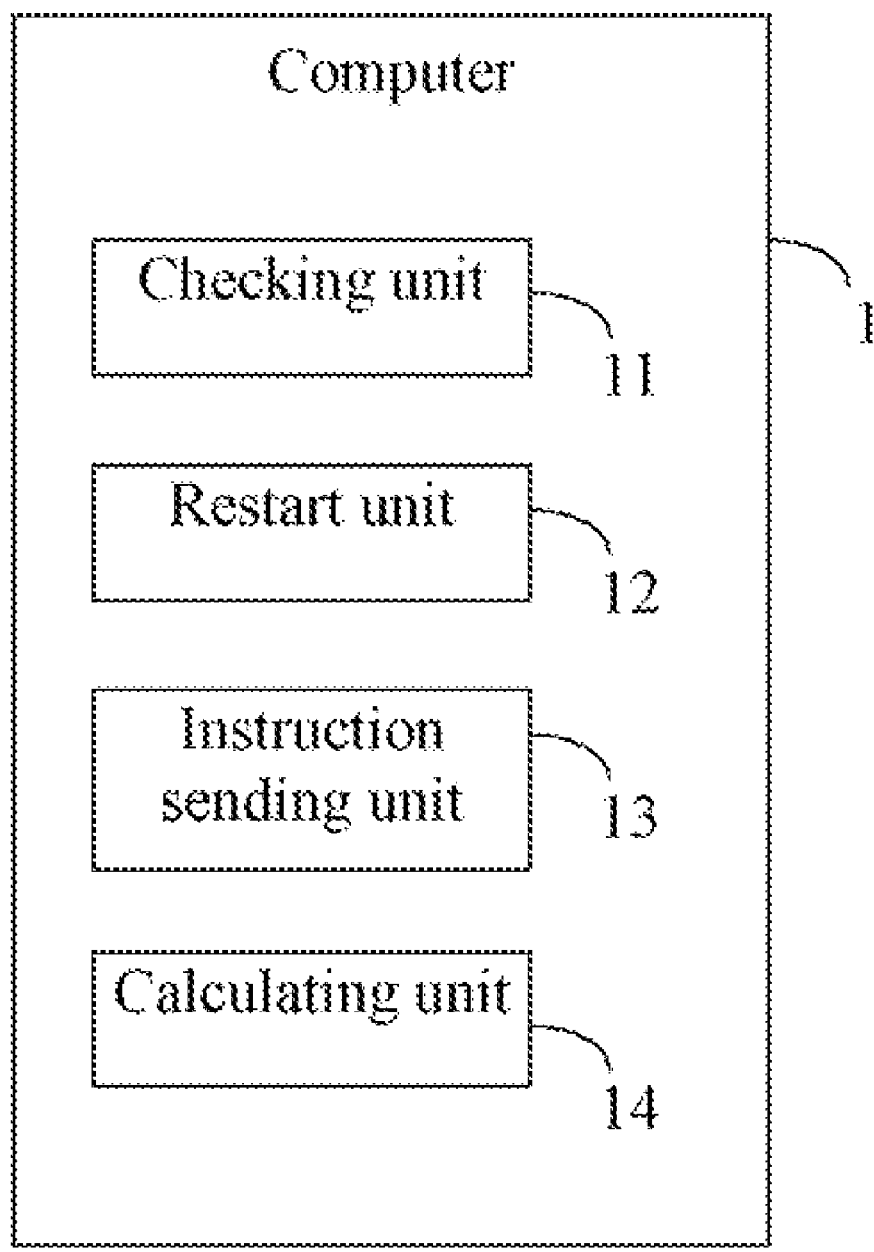
FIG. 2 is a schematic diagram of function units of a computer of FIG. 1.

FIG. 2 is a schematic diagram of function units of the computer 1. The computer 1 includes a checking unit 11, a restart unit 12, an instruction sending unit 13, and a calculating unit 14.

The checking unit 11 is configured for detecting whether there are any faults on the measuring machine before the measuring machine starts operating, and for alerting/alarming of the faults of the measuring machine in order to ensure the safety and reliability of the measuring machine when the measuring machine is in operation. Before the movable arm moves to collect the images of the prototype, the checking unit 11 checks whether the state of the emergency stop button is in the enabled state or the disabled state, if the limit switch is in the enabled state, and if the servo 3 is in a closed loop state. When the movable arm is moving, the checking unit 11 continuously/repeatedly detects if the state of the servo 3 is in the closed loop state.

The restart unit 12 is configured for sending the restart instructions that controls the movable arm to return to the initial position in relation to the X-axis, Y-axis, and Z-axis directions to the measuring machine via the control card 2, so as for the measuring machine to obtain an initial position coordinates. The coordinates of the initial position are (0, 0, 0). When the restart unit 12 sends the restart instructions to the measuring machine via the control card 2, the movable arm returns to the initial position in relation to the X-axis, Y-axis, and Z-axis directions.

The instruction sending unit 13 is configured for sending the move instructions to the measuring machine via the control card 2. The move instructions contain information of a final position of the movable arm, and a speed fraction of the movable arm.

The calculating unit 14 is configured for calculating a moving speed of the movable arm according to the speed fraction and a maximum speed of the movable arm, calculating a current position of the movable arm according to the count tracked by the raster ruler 6, and for determining whether the raster ruler 6 is at the final position. The moving speed of the movable arm (depicted as "V") is calculated by a formula as follows: $V=V_0 *S$. Wherein, "$V_0$" represents the maximum speed defined by performance of the movable arm, and "S" represents a speed fraction (in percentage). For example, if the speed fraction is S=30%, and the maximum speed is V0=1000 m/s, then the moving speed of the movable arm equals "V" (m/s) multiplied by "S" (that is, V=30%*1000 m/s).

Figure 3:
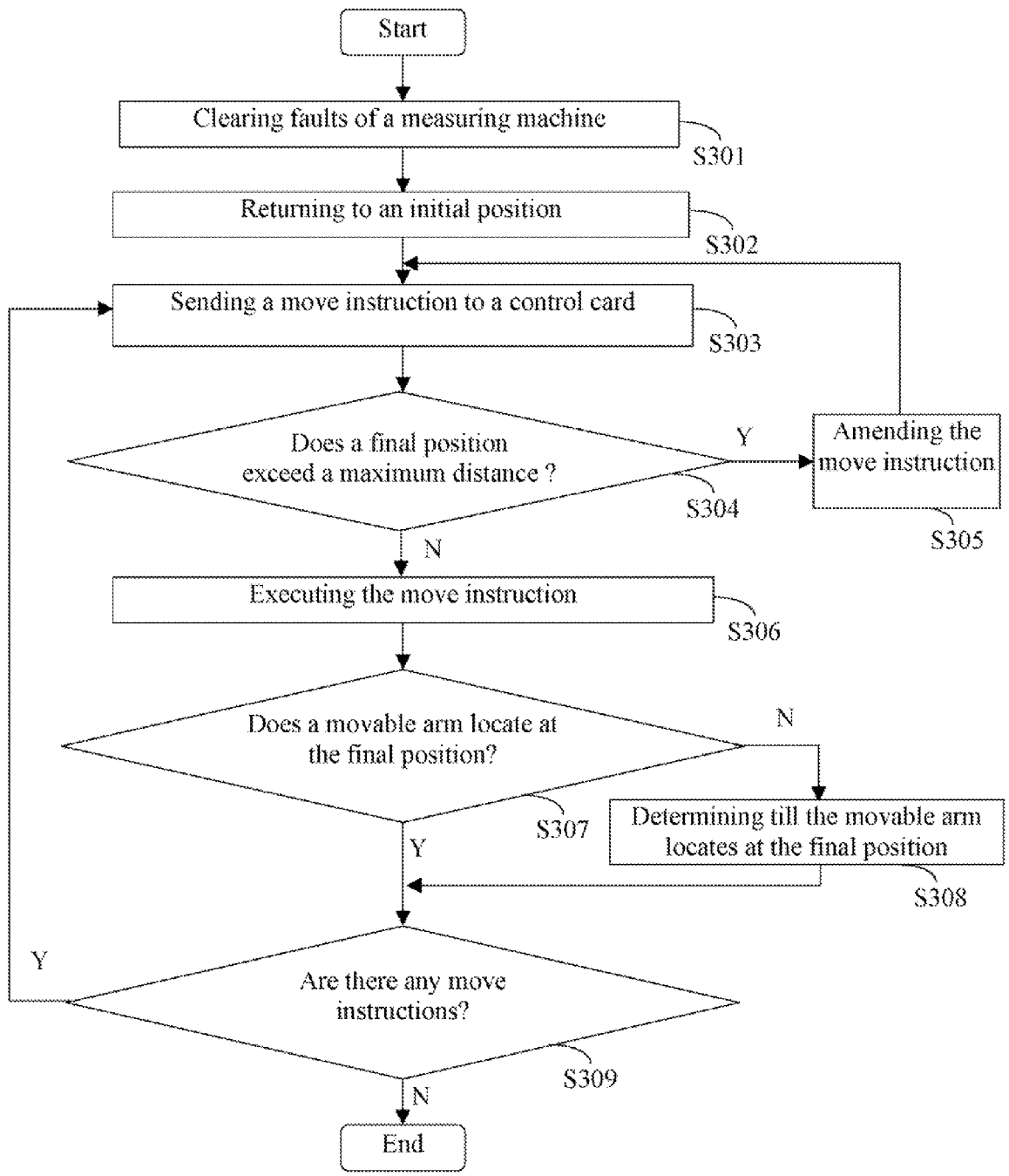
FIG. 3 is a main flow-chart of a preferred method for controlling operations of a measuring machine by implementing the system of FIG. 1.

FIG. 3 is a main flowchart of a preferred method for controlling operations of the measuring machine by implementing the system as described above. In step S301, the checking unit 11 detects if there are faults, if there are any faults, the checking unit 11 sounds the alarm/alert indicating that the faults of the measuring machine need to be cleared, in order to ensure the safety and reliability of the measuring machine when the measuring machine is operating.

In step S302, the restart unit 12 sends the restart instruction via the control card 2 to the measuring machine for controlling the movable arm to return to the initial position. The coordinates of the initial position are (0, 0, 0) in relation to the X-axis, Y-axis, and Z-axis directions.

In step S303, the instruction sending unit 13 sends the move instruction to the control card 2. The move instruction contains information on the final position where the movable arm locates at the measuring machine, and the speed fraction of the movable arm.

In step S304, the instruction sending unit 13 determines whether the final position on the measuring machine exceeds a maximum distance of the movable arm. The maximum distance of the movable arm is determined by performance of the measuring machine.

If the final position exceeds the maximum distance, in step S305, the engineer amends the move instruction, then the procedure returns to step S303 described above.

Otherwise, if the final position doesn't exceed the maximum distance, in step S306, the movable arm begins to move along the measuring machine by executing the move instruction. At the same time, the raster ruler 4 starts tracking from zero.

In step S307, the calculating unit 14 calculates current position of the movable arm according to the count tracked by the raster ruler 4, and determines whether the movable arm locates at the final position.

If the movable arm doesn't locate at the final position, in step S308, the calculating unit 14 determines continually till the movable arm locating at the final position.

Otherwise, if the movable arm locates at the final position, in step S309, the measuring machine determines whether there are any more of the move instructions. If there is no move instruction, the procedure goes end. Otherwise, if there are some move instructions, the procedure returns to S303 described above.

Figure 4:
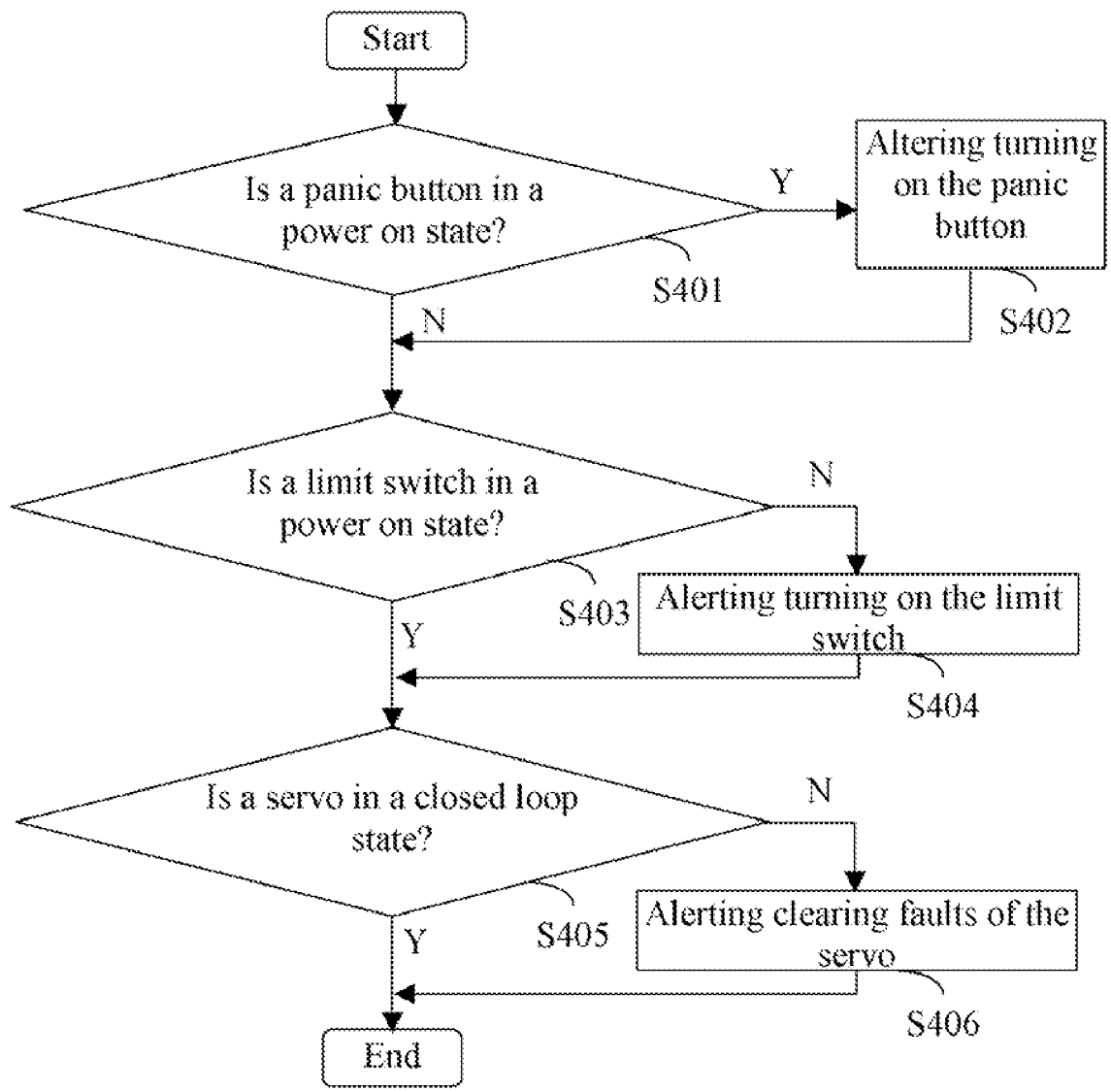
FIG. 4 is a detail flow-chart illustrating clearing faults of the measuring machine of FIG. 3.

FIG. 4 is a detail flowchart of illustrating the step of clearing faults of the measuring machine (step S301) of FIG. 3. In step S401, the checking unit 11 checks whether the emergency stop button is in the enabled state or the disabled state. If the emergency stop button is in the enabled state, in step S402, the checking unit 11 alerts the engineer to turn on the emergency stop button. If the emergency stop button is in the disabled state, in step S403, the checking unit 11 checks whether the limit switch is in the power-on state or the power-off state. If the limit switch is in the power-off state, in step S404, the checking unit 11 alerts the engineer to turn on the limit switch. If the limit switch is in the power-on state, in step S405, the checking unit 11 checks whether the servo 3 is in the opened loop or the closed loop state. If the servo 3 is in the opened loop state, in step S406, the checking unit 11 alters the engineer to clear faults of the servo 3 for assuring the servo 3 is in the closed loop state. Otherwise, if the servo 3 is in the closed loop state, the procedure goes to end.

Figure 5:
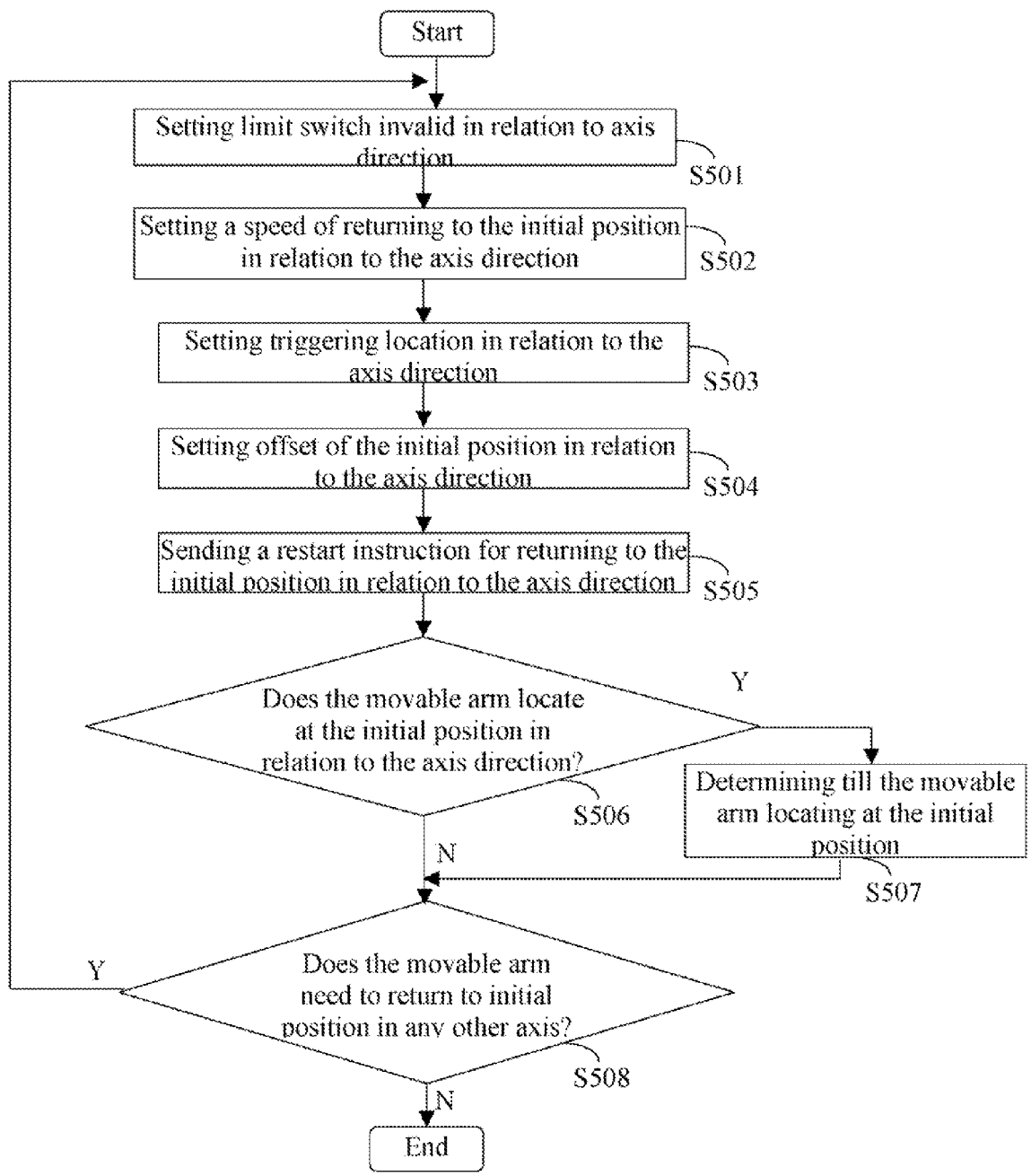
FIG. 5 is a detail flow-chart illustrating returning to initial position of the measuring machine of FIG. 3.

FIG. 5 is a detail flowchart of illustrating the step of the movable arm returning to the initial position (step S302) of FIG. 3. In step S501, the engineer sets the limit switch invalid for the movable arm in relation to the axis direction, such as the X-axis direction. In step S502, the engineer sets the speed for the movable arm returning to the initial position in relation to the x-axis direction. In step S503, the engineer sets a trigger position in relation to the x-axis direction. In step S504, the engineer sets an offset of initial position in relation to the x-axis direction. After the engineer finishes all settings, in step S505, the restart unit 12 sends the restart instruction for the movable arm to return to the initial position. In step S506, the restart unit 12 determines whether the movable arm returns to initial position in relation to the x-axis direction. If the movable arm doesn't return to initial position in relation to the x-axis direction, In step S507, the restart unit 12 determines continuously till the movable arm locating at the initial position in relation to the x-axis direction, then the procedure goes to step S508. Otherwise, in step S508, the restart unit 12 determines whether the movable arm need to return to the initial position in relation to any other axis directions (for example, the Y-axis direction or the Z-axis direction). If the movable arm need to return to the initial position in relation to other axis directions, the procedure returns to step S501 described above. Otherwise, the procedure goes end.

It should be emphasized that the above-described embodiments, particularly, any "preferred" embodiments, are merely possible examples of implementations, and merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure, and the present invention is protected by the following claims.

What is claimed is:

1. A system for controlling operations of a measuring machine, comprising a computer, a control card, a servo, and a raster ruler fixed on a movable arm of the measuring machine, the computer comprising:
   a checking unit configured for checking whether there are any faults before the movable arm starts to operate, and for alerting clearing any of the faults of the measuring machine;
   a restart unit configured for sending a restart instruction via the control card to the measuring machine for controlling the movable arm to return to an initial position in relation to an X-axis, a Y-axis, and a Z-axis directions; and
   an instruction sending unit configured for sending a move instruction comprising information of a final position to the measuring machine via the control card, for determining whether the final position exceeds a maximum distance of the movable arm, and for controlling the movable arm to move according to the move instruction if the final position does not exceed the maximum distance; and
   a calculating unit configured for calculating a current position of the movable arm according to a count tracked by the raster ruler, and for determining whether the movable arm is at the final position.

2. The system according to claim 1, wherein the move instruction further comprises a speed fraction of the movable arm.

3. The system according to claim 2, wherein the calculating unit is further configured for calculating a moving speed of the movable arm according to the speed fraction and a maximum speed of the movable arm.

4. The system according to claim 1, wherein the servo drives the movable arm to move according to the move instruction.

5. The system according to claim 1, wherein the raster ruler is a position feedback component fixed on the movable arm of the measuring machine and is either of a magnetoscale ruler and a rotary encoder.

6. An enabled-computerized method for controlling operations of a measuring machine, the method comprising the steps of:
   clearing any faults of the measuring machine;
   sending a restart instruction via a control card to the measuring machine for controlling a movable arm of the measuring machine to return to an initial position in relation to an X-axis, a Y-axis and a Z-axis directions;
   sending a move instruction comprising information of a final position;
   determining whether the final position exceeds a maximum distance of the movable arm;
   executing the move instruction if the final position does not exceed the maximum distance;
   calculating a current position of the movable arm according to a count tracked by a raster ruler; and
   determining whether the movable arm is located at the final position according to the count; and
   controlling the movable arm to move along the measuring machine by executing a next move instruction, if the movable arm is located at the final position.

7. The method according to claim 6, wherein the step of clearing faults of the measuring machine comprises the steps of:
   alerting an engineer to turn on an emergency stop button if the emergency stop button is in a power-on state;
   alerting the engineer to turn on a limit switch if the limit switch is in a power-off state; and
   alerting the engineer to clear the faults if a servo is in an opened loop state.

8. The method according to claim 6, wherein the step of determining whether the final position exceeds a maximum distance of the movable arm comprises the step of:
   amending the move instruction if the final position exceeds the maximum distance of the movable arm.

9. The method according to claim 6, wherein the step of determining whether the movable arm is located at the final position according to the count comprises the step of:
   determining continuously till the movable arm is located at the final position.

10. The method according to claim 6, further comprising the steps of:
    setting a limit switch invalid for the movable arm in relation to an axis direction;
    setting a speed of returning to an initial position in relation to the axis direction;
    setting a trigger position in relation to the axis direction;
    setting an offset of the initial position in relation to the axis direction; and
    sending a restart instruction for returning to the initial position in relation to the axis direction.

11. The method according to claim 10, further comprising the steps of:
    determining whether the measuring machine returns to the initial position in relation to the axis direction;
    determining whether the movable arm needs to return to the initial position in relation to any other axis directions; and
    repeating the setting steps to the sending step if the movable arm needs to return to the initial position in relation to other axis directions.

* * * * *